United States Patent
Eliosov et al.

(10) Patent No.: US 12,297,130 B2
(45) Date of Patent: *May 13, 2025

(54) METHOD AND SYSTEM FOR TREATING ULTRAPURE WATER

(71) Applicant: EVOQUA WATER TECHNOLOGIES LLC, Pittsburgh, PA (US)

(72) Inventors: Boris Eliosov, St. Marys, PA (US);
Bruce Lee Coulter, Rockford, IL (US);
Glen P. Sundstrom, Rockford, IL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,104

(22) Filed: Jun. 29, 2023

(65) Prior Publication Data

US 2023/0357056 A1 Nov. 9, 2023

Related U.S. Application Data

(60) Continuation of application No. 17/353,735, filed on Jun. 21, 2021, now Pat. No. 11,702,351, which is a
(Continued)

(51) Int. Cl.
*B01D 61/18* (2006.01)
*B01D 61/22* (2006.01)
(Continued)

(52) U.S. Cl.
CPC .............. *C02F 1/444* (2013.01); *B01D 61/18* (2013.01); *B01D 61/22* (2013.01); *B01D 63/02* (2013.01);
(Continued)

(58) Field of Classification Search
CPC ...... B01D 61/14; B01D 61/145; B01D 61/18; B01D 61/20; B01D 61/22; B01D 63/02;
(Continued)

(56) References Cited

U.S. PATENT DOCUMENTS

| 4,158,629 A | 6/1979 | Sawyer |
| 4,253,962 A | 3/1981 | Thompson |

(Continued)

FOREIGN PATENT DOCUMENTS

| CN | 103566758 A | 2/2014 |
| JP | H05137972 A | 6/1993 |

(Continued)

OTHER PUBLICATIONS

Chinese Second Office Action, corresponding CN 201780056852.4, mailed Nov. 8, 2021.

(Continued)

*Primary Examiner* — Joseph W Drodge

(57) ABSTRACT

According to various aspects and embodiments, a system and method for polishing ultrapure water (UPW) is disclosed. The water polishing system includes a source of ultrapure water (UPW), an ultrafiltration (UF) module having an inlet and a permeate outlet, a recirculation conduit communicating the permeate outlet with the inlet and forming a recirculation loop, a recirculation pump disposed along the recirculation conduit upstream from the inlet of the UF module and fluidly coupled to the source of UPW, a supply conduit fluidly coupled to the recirculating conduit and a demand source, the supply conduit positioned downstream from the permeate outlet, and a pressure control valve disposed along the recirculation conduit downstream from the supply conduit and configured to maintain pressure of permeate at a predetermined value.

12 Claims, 11 Drawing Sheets

Related U.S. Application Data division of application No. 16/333,280, filed as application No. PCT/US2017/051763 on Sep. 15, 2017, now Pat. No. 11,072,545.

(60) Provisional application No. 62/435,119, filed on Dec. 16, 2016, provisional application No. 62/394,788, filed on Sep. 15, 2016.

(51) Int. Cl.
  *B01D 63/02* (2006.01)
  *C02F 1/44* (2023.01)
  *C02F 103/04* (2006.01)

(52) U.S. Cl.
  CPC ...... *B01D 2311/25* (2013.01); *B01D 2313/50* (2013.01); *C02F 2103/04* (2013.01); *C02F 2209/03* (2013.01); *C02F 2301/046* (2013.01)

(58) Field of Classification Search
  CPC ............... B01D 65/08; B01D 2311/25; B01D 2311/26; B01D 2313/50; B01D 2321/2058; B01D 63/16; B01D 2311/06; B01D 2311/14; B01D 2311/2512; B01D 2315/04; C02F 1/34; C02F 1/36; C02F 1/44; C02F 1/444; C02F 2103/04; C02F 2209/005; C02F 2209/02; C02F 2209/03; C02F 2209/40; C02F 2301/046; C02F 1/725; C02F 2303/16
  USPC ............................................. 210/195.2, 257.2
  See application file for complete search history.

(56) References Cited

U.S. PATENT DOCUMENTS

| | | |
|---|---|---|
| 5,227,071 A | 7/1993 | Torline et al. |
| 5,536,403 A | 7/1996 | Sugimoto |
| 5,645,727 A * | 7/1997 | Bhave .................. B01D 65/022 |
| | | 210/651 |
| 5,944,998 A | 8/1999 | Rolchigo et al. |
| 6,077,437 A | 6/2000 | Hayashi et al. |
| 11,072,545 B2 * | 7/2021 | Eliosov .................... C02F 1/444 |
| 11,702,351 B2 * | 7/2023 | Eliosov .................. B01D 61/22 |
| | | 210/637 |
| 2002/0043487 A1 | 4/2002 | Schick |
| 2002/0137650 A1 * | 9/2002 | Okumura .............. B08B 9/0321 |
| | | 510/253 |
| 2006/0011546 A1 | 1/2006 | Livingston |
| 2006/0144787 A1 | 7/2006 | Schmidt et al. |
| 2007/0151925 A1 | 7/2007 | de los Reyes et al. |
| 2009/0134080 A1 | 5/2009 | Fabig |
| 2009/0165829 A1 | 7/2009 | Morita et al. |
| 2009/0182263 A1 * | 7/2009 | Burbank ............... A61J 1/2003 |
| | | 210/767 |
| 2011/0315632 A1 | 12/2011 | Freije, III et al. |
| 2012/0243704 A1 | 9/2012 | Sorensen |
| 2013/0248450 A1 * | 9/2013 | Kenley ............... A61M 1/3633 |
| | | 210/96.1 |
| 2014/0339161 A1 * | 11/2014 | Leonard ............. A61M 1/3403 |
| | | 210/637 |
| 2015/0037319 A1 | 2/2015 | Lau et al. |

FOREIGN PATENT DOCUMENTS

| | | |
|---|---|---|
| KR | 10-2015-0128350 A | 11/2015 |
| WO | 97039981 A1 | 10/1997 |
| WO | 2015198080 A1 | 12/2015 |
| WO | 2018053253 A1 | 3/2018 |

OTHER PUBLICATIONS

International Search Report from corresponding PCT/US17/51763, dated Dec. 4, 2017.

Korean Notice to Submit Response, corresponding KR 10-2019-7008749, mailed Nov. 15, 2021.

* cited by examiner

METHOD AND SYSTEM FOR TREATING ULTRAPURE WATER

RELATED APPLICATIONS

This application claims priority under 35 U.S.C. § 119(e) to U.S. Provisional Application Ser. No. 62/394,788, titled POLISHING ULTRAFILTRATION PERFORMANCE ENHANCEMENT FOR VANOX POU, POU FILTRATION, HWC AND FULL FLOW POLISHING UF," filed on Sep. 15, 2016, and to U.S. Provisional Application Ser. No. 62/435,119, titled "FILTRATION SYSTEM FOR INDUSTRIAL WATER TREATMENT," filed on Dec. 16, 2016, each of which is herein incorporated by reference in their entirety.

FIELD OF THE INVENTION

The present invention relates generally to water treatment and, more particularly, to a water polishing system for ultrapure water (UPW).

BACKGROUND

Advances in semiconductor design and manufacturing have led to the development of increasingly smaller and more powerful devices. The smaller dimensions used in these structures makes them increasingly sensitive to the presence of smaller particles present in processing fluids used for manufacturing the devices, such as UPW. Particles of 20 nm and smaller may significantly impact the yield of certain semiconductor devices. The detection and removal of these small particles has proven to be a difficult problem to resolve.

SUMMARY

Aspects and embodiments are directed to filtration for particle control in ultrapure water.

According to one embodiment a water polishing system includes a source of ultrapure water (UPW), an ultrafiltration (UF) module having an inlet and a permeate outlet, a recirculation conduit communicating the permeate outlet with the inlet and forming a recirculation loop, a recirculation pump disposed along the recirculation conduit upstream from the inlet of the UF module and fluidly coupled to the source of UPW, a supply conduit fluidly coupled to the recirculating conduit and a demand source, the supply conduit positioned downstream from the permeate outlet, and a pressure control valve disposed along the recirculation conduit downstream from the supply conduit and configured to maintain a pressure of permeate at a predetermined value.

In one example the water polishing system further includes a pressure sensor positioned along the recirculation conduit between the supply conduit and the pressure control valve, where the pressure sensor is configured to generate a pressure signal indicative of a pressure of the permeate. In one example the water polishing system further includes a controller operatively coupled to the pressure sensor and configured to control operation of the pressure control valve based on the pressure signal.

In one example the water polishing system further includes a UPW make-up conduit fluidly coupled to the source of UPW and the recirculation conduit, and a blending point where the UPW make-up conduit fluidly connects to the recirculation conduit such that the pressure control valve is positioned between the blending point and the pressure sensor, and the controller is configured to operate the pressure control valve such that the pressure of the permeate is maintained at a predetermined pressure value.

In one example the recirculation pump is positioned downstream from the blending point such that a fluid including UPW and permeate is delivered to the recirculation pump at the predetermined pressure value.

In one example the recirculation pump is configured to operate at a predetermined constant speed.

In one example the UF module further includes a reject outlet for retentate from the UF module and a reject conduit fluidly coupled to the reject outlet.

In one example the water polishing system further includes a holding tank disposed along the recirculation conduit.

In one example the water polishing system further includes a vibration source coupled to the UF module.

Another embodiment is directed to a method of treating water. The method includes receiving a flow of ultrapure water (UPW) directed toward a recirculation pump from a source of UPW, setting the speed of the recirculation pump to a predetermined constant speed, directing a fluid including the UPW to an inlet of an ultrafiltration (UF) module, recirculating at least a portion of permeate from a permeate outlet of the UF module to the inlet using the recirculation pump and a recirculation conduit, providing a valve arrangement actuable from a closed to an open condition for effecting pressure of permeate to the recirculation pump, measuring a pressure of the permeate at a position that is upstream from the valve arrangement and downstream from the permeate outlet, comparing the measured pressure of the permeate to a predetermined value, and responsive to the comparison, actuating the valve arrangement.

In one example the valve arrangement is actuated to maintain a substantially constant transmembrane pressure (TMP) across a UF membrane of the UF module.

In one example the method further includes combining the flow of UPW with permeate at a blending point positioned along the recirculation conduit such that the valve arrangement is positioned upstream from the blending point.

In another example the method further includes providing a supply conduit to a demand source along the recirculation conduit at a position upstream from the pressure measurement position and downstream from the permeate outlet.

In another example the recirculation pump is configured to deliver the fluid to the UF module at a pressure that is greater than the predetermined value.

In one example the method further includes applying a vibration to the UF module.

Another embodiment is direct to a method of facilitating polishing of ultrapure water (UPW). The method includes providing an ultrafiltration (UF) module having an inlet and a permeate outlet, and providing instructions to: connect the permeate outlet to the inlet, connect the permeate outlet to a pressure control valve, and maintain a pressure of permeate exiting the permeate outlet at a predetermined value with the pressure control valve.

In one example, the method further includes providing instructions to: connect a recirculation pump to the inlet of the UF module, blend the permeate with a source of UPW to form a fluid, and direct the fluid to an inlet of the recirculation pump.

In one example, the method further includes providing instructions to: connect the permeate outlet to a demand source, and measure a pressure of the permeate using a pressure sensor prior to blending with the source of UPW.

In one example the method further includes providing a controller that is configured to be operatively coupled to the pressure sensor and the pressure control valve. In another example the method further includes providing control instructions to the controller to compare a measured pressure of the permeate to a predetermined value and, responsive to the comparison, actuate the pressure control valve. In one example the control instructions instruct the controller to actuate the pressure control valve to maintain a substantially constant transmembrane pressure (TMP) across a UF membrane of the UF module. In one example, the method further includes providing at least one of the recirculation pump and the pressure control valve.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

As discussed above, there is presently a need for the ability to remove particles having a diameter of 20 nm and smaller from semiconductor device fabrication processes, including process that use UPW. Certain current applications and future semiconductor devices will require the ability to remove particles sized at 10 nm and smaller.

Figure 1:
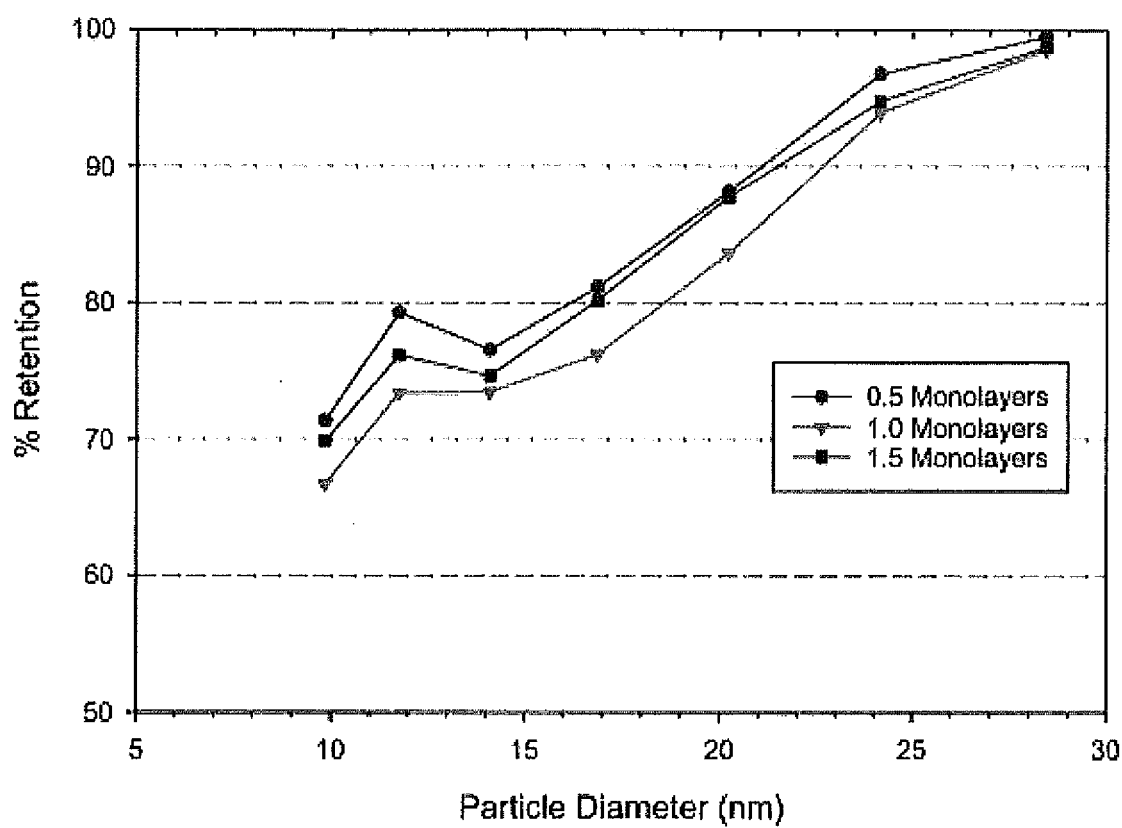
FIG. 1 is a graph showing the percent retention efficiency for a filtration system in removing particles of various sizes from UPW.

Typical UPW delivery systems suffer from a number of deficiencies in meeting these requirements. For instance, the filters that are used may not be able to completely remove particles sized at 20 nm or smaller. The data presented in the graph of FIG. 1 shows the percent retention of a cartridge filtration device according to particle size. As indicated in FIG. 1, the cartridge filter was effective at removing over 95% of particles having a diameter larger than 25 nm, but was only capable of removing between about 67-87% of particles sized at or between 10-20 nm.

Figure 2:
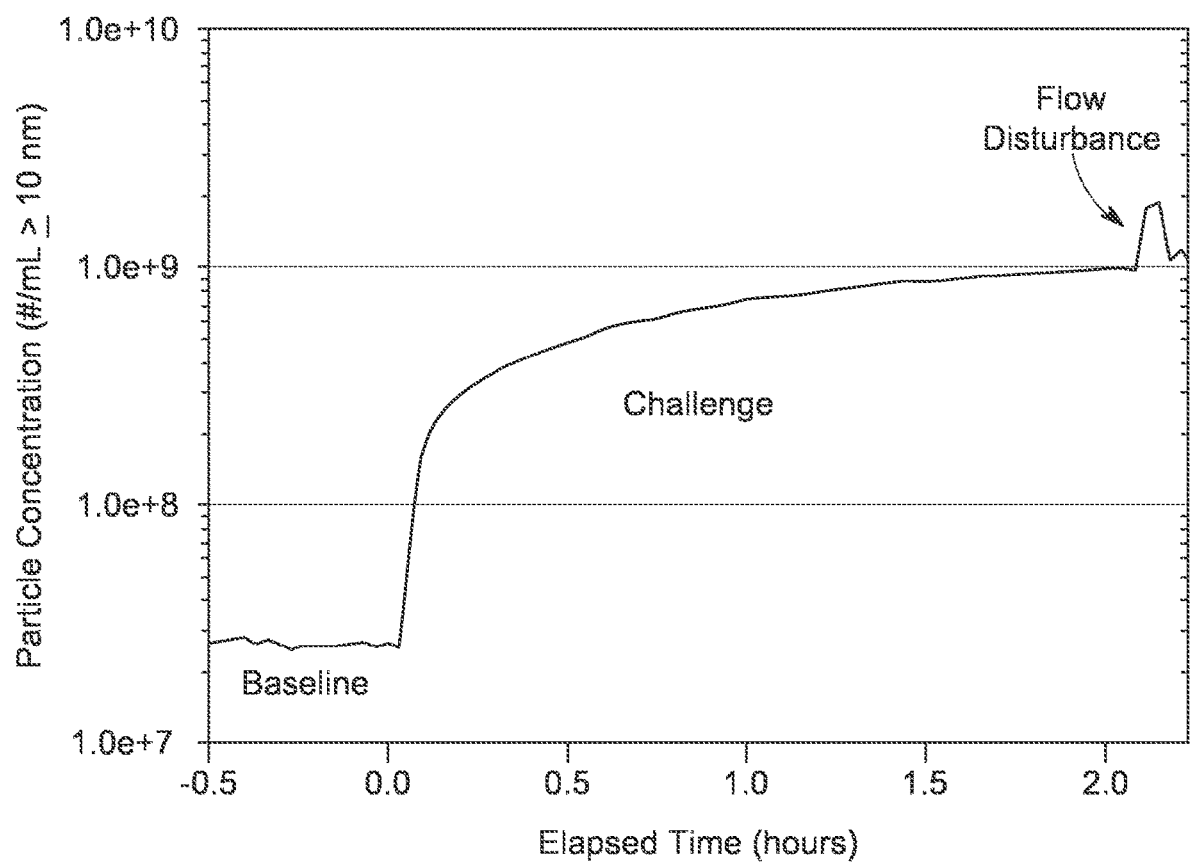
FIG. 2 is a graph showing the concentration of particles in permeate from a filtration unit during a flow disturbance event.

Another deficiency of typical UPW delivery systems is that the filters may produce particles when they are operated under varying flow rate and pressure conditions. The graph presented in FIG. 2 shows the concentration of particles in the filtrate of a cartridge filtration device over time when the system was challenged with both a colloidal material having a particle concentration of $5\times10^9$ particles per milliliter and a flow disturbance, i.e., flow rate and pressure fluctuation. The results show that the flow disturbance caused a spike in the concentration of particles in the effluent to a value that exceeded $1\times10^9$ particles per milliliter, which indicates that flow fluctuations can drive particles through the filter. Lastly, yet another deficiency of typical UPW delivery systems is that the fibers used in the membranes of the UF devices are susceptible to flow and pressure variations, as well as oxidants, both of which can cause fiber breakage.

Figure 3:
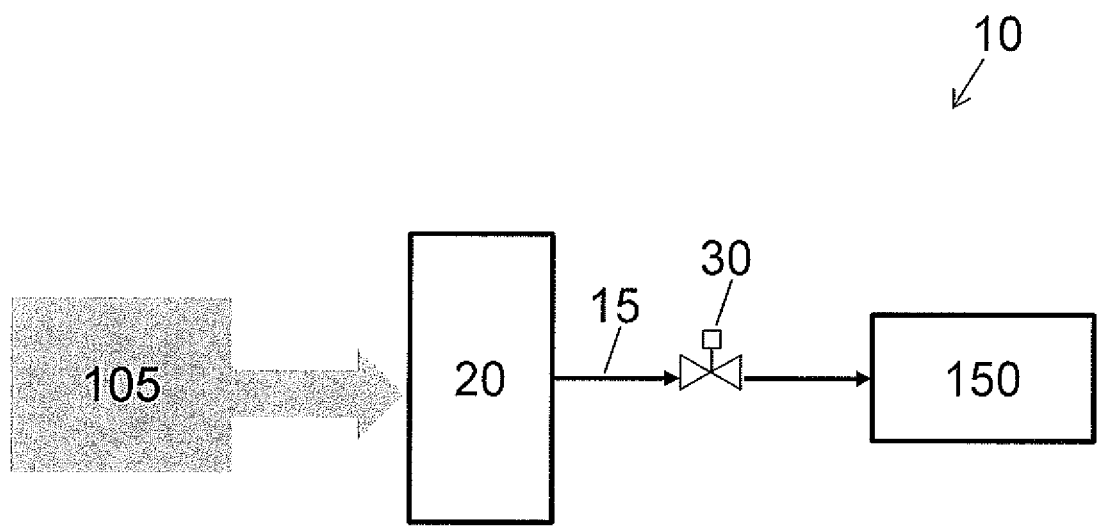
FIG. 3 is a schematic flow diagram of a prior art point of use (POU) water treatment system.

Referring to FIG. 3, a schematic diagram of one example of a typical point of use (POU) water purification system is shown and generally designated by reference number 10. The system 10 includes a filtration unit 20 positioned downstream from a source of UPW 105 and is configured for operation in a single-pass mode, such that the UPW passes once through the filtration unit 20. As used herein, the term "point of use" refers to a filtration system that is located in proximity to a demand source 150, such as a semiconductor manufacturing tool. In certain instances, the demand source 150 may be positioned in a sub-fab or utility level location positioned under the tool. The filtration unit 20 shown in the POU system 10 of FIG. 3 is a cartridge filter that is configured for dead-end filtration. In dead-end filtration feed (the ultrapure water from the UPW source 105) is passed through a filter such as a membrane or bed where solids are trapped or otherwise retained by the filter, and permeate 15 exits the filtration unit 20.

The POU system 10 is supplied with UPW 105 from a main UPW treatment system. Many industrial applications of water, including semiconductor fabrication, require the use of UPW, which is water that has a very low organic carbon content, i.e., a total organic carbon (TOC) level that is less than about 25 ppb, and in some instances may be less than about 1 ppb. Total organic carbon refers to the parts per billion of water that are carbon atoms associated with organic compounds. UPW may be used during various steps of the manufacturing process to rinse various chemicals and particulate materials from the devices, such as by dissolving organic deposits from substrate surfaces. The UPW must meet stringent quality requirements since contaminants in the UPW can have a negative effect on the yield of the semiconductor devices. Typical contaminants include organic and inorganic compounds, as well as particulate matter.

The UPW treatment system is equipped with one or more devices that generate the UPW and can include, for example, processes that include filtration, ion exchange, and exposure to ultraviolet radiation. For instance, the UPW treatment system may include pressure driven membrane processes such as reverse osmosis and nanofiltration, deionization processes such as electrodeionization and regenerable ion exchange, and particulate removal processes such as ultrafiltration and sub-micron particle filters. Another example of a UPW treatment system that may be used for providing the source of UPW 105 is a system that uses an advanced oxidation process (AOP). Advanced oxidation processes generally refer to oxidation methods that are based on generation of strong and non-selective free radicals, which attack and destroy organic contaminants in the water. Non-limiting examples of oxidizing agents include ultraviolet light, ozone, hydrogen peroxide, and persulfate. Contaminated water reacts with one or more oxidizing agents, such as hydrogen peroxide combined with ultraviolet light to generate the reactive radicals. The organic carbon is thereby oxidized to carbon dioxide, which becomes dissolved in water. One example of a UPW system that may be used to generate the source of UPW 105 is the VANOX® AOP System available from Evoqua Water Technologies (Pittsburgh, PA).

According to certain embodiments, the UPW 105 generated by the UPW treatment system includes water that has a TOC that is less than 5 ppb. In some instances the source of UPW may have a TOC concentration of less than 1 ppb. In addition, the UPW 105 may have an electrical resistivity in a range of between about 17-18.2 megaohm-cm, and in some instances may have an electrical resistivity of about 18.2 megaohm-cm. The particle concentration (particles sized at 50-100 nm) of the UPW 105 may be less than 200 particles per liter. The UPW 105 may also have one or more other properties, including a dissolved oxygen of less than 3 ppb, an on-line residue of less than 100 ppt, a bacteria count that is less than 1 CFR/100 mL sample, and a total silica concentration of less than 1 ppb.

The source of UPW 105 may be delivered to the POU system 10 at a predetermined pressure, which may be a value that exceeds the minimum pressure required by the demand source 150. In some instances, the pressure exerted by the UPW 105 in the POU system 10 of FIG. 3 functions as the driving force for passing the UPW through the filtration unit 20. In some instances, the UPW 105 may be at a pressure ranging from 3-5 bars (—43.5-72.5 psi). In some embodiments, the UPW 105 may be at a pressure greater than 5 bars.

The POU system 10 of FIG. 3 is configured to operate in the on-off regime using the valve 30 according to the consumption requirements of the demand source 150. Therefore, the only time the filtration unit 20 treats the UPW 105 is when the demand source 150 actually consumes permeate 15. In addition, the filtration unit 20 will only treat the UPW 105 at the flow rate that the demand source 150 consumes the permeate 15. This type of intermittent flow through the filtration unit 20 creates the risk of particles being released from the filter. This is because the pulse created by the sudden increase in the fluid flow rate generates an additional driving force for particles sized smaller than the filter pores to escape the filter, i.e., breakthrough, and can also generates particles that originate from the filter material itself.

As noted above, the UPW treatment system may provide UPW 105 at a predetermined pressure that exceeds the minimum pressure required by the demand source 150. However, when the head loss in the filtration unit 20 is greater than the minimum pressure required by the demand source 150, then the filtration unit 20 can no longer be used. Furthermore, as the mechanical strength of the filter increases and pore size decreases, the head loss further increases. These constraints make it increasingly difficult to use the POU system 10 for providing ultrapure water that meets modern or future requirements for particulates.

In accordance with at least one embodiment, a water treatment system is provided that is capable of providing POU ultrapure water to a semiconductor process. The water treatment system may function as a water polishing system that is positioned downstream from a source of UPW and removes or substantially reduces the presence of particles that are 20 nm, and in some instances, 10 nm or smaller in diameter from ultrapure water delivered to a demand source such as a semiconductor tool.

Figure 4:
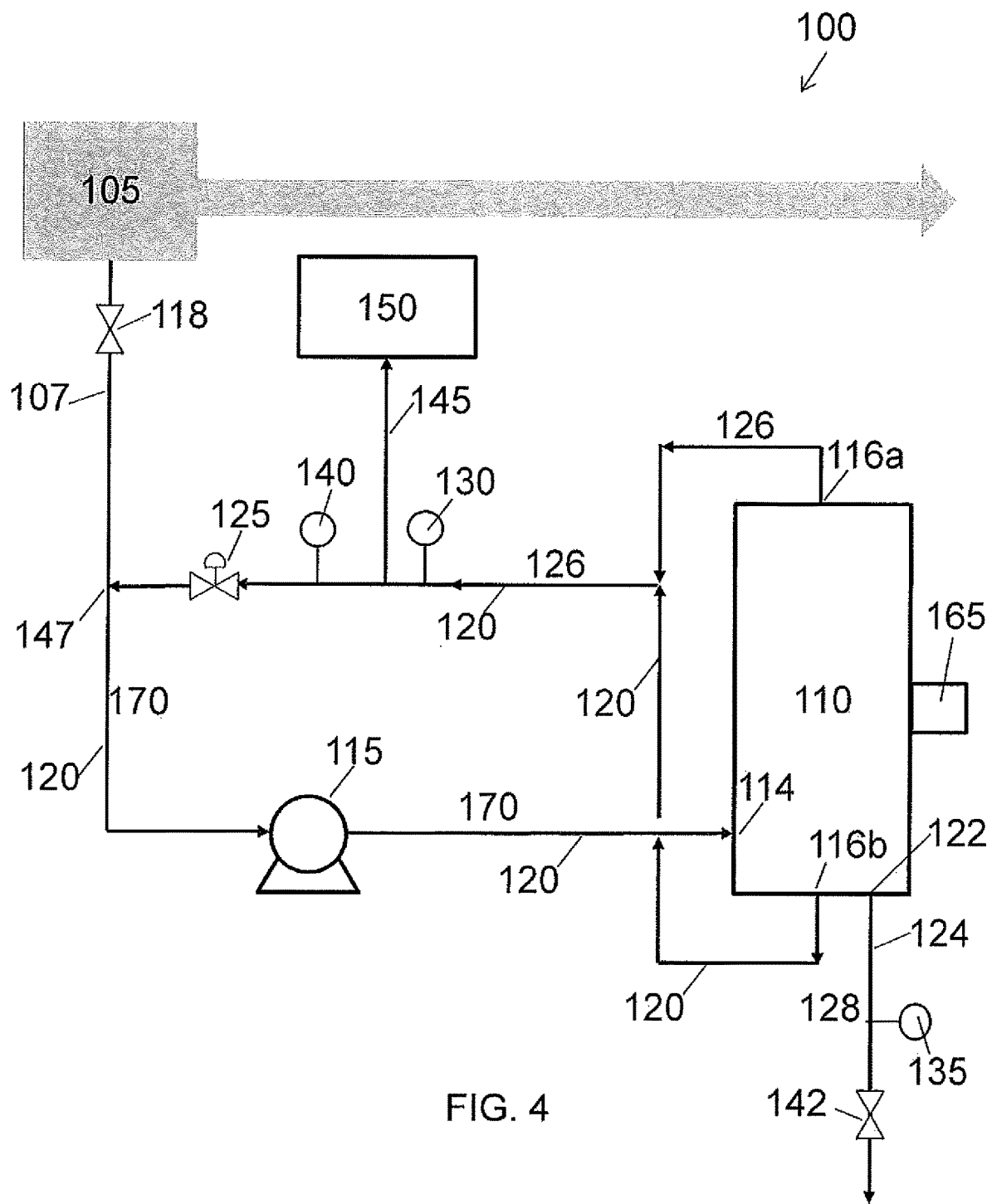
FIG. 4 is a schematic flow diagram of one example of a water polishing system in accordance with one or more aspects of the invention.

FIG. 4 is a flow diagram of one embodiment of a water polishing system 100 (also referred to herein as simply "system 100"). The system 100 comprises a source of UPW 105, a UF module 110, a recirculation conduit 120, a supply conduit 145, and a pressure control valve 125. The water polishing system 100 functions to polish UPW from a main UPW treatment system and deliver the polished UPW as permeate to the demand source 150.

The source of UPW 105 may be the same source as discussed above in reference to POU system 10 discussed above. For instance, the source of UPW 105 may be generated by a main UPW treatment system, such as an AOP treatment system, that is positioned upstream from the water polishing system 100. The source of UPW 105 may be provided at a certain pressure. For instance, the source of UPW 105 may be at a pressure of about 20 psi to about 100 psi. The pressure of the UPW provided by the UPW source 105 may depend on the pressure requirements of the demand source 150. In one embodiment, the UPW 105 is at a pressure in a range of about 3-5 bar. In other embodiments, the UPW 105 is at a pressure that is greater than 5 bar. The source of UPW 105 may also be provided at a certain flow rate. For example, in some instances the source of UPW may be at a flow rate of about 0 to about 50 gpm. According to one embodiment, the source of UPW may have a flow rate of 20-30 gpm.

The UF module 110 functions as a filtration device for removing undesirable contaminants, such as particulates, including particulates having high molecular weights and particulates having a certain size. The UF module 110 has an inlet 114 for receiving fluid 170 and a permeate outlet 116 (labeled as 116a and 116b in FIG. 6) for permeate 126. Although not explicitly shown, the UF module 110 also includes at least one UF membrane that provides the filtration functionality. The UF membrane may be arranged according to a hollow fiber design as known in the art, and may be dependent on a particular application and/or user's preferences. According to one embodiment, the UF membrane has a molecular cut off (MWCO) of at least 4000. According to some embodiments, the UF membrane has a MWCO of 6000-10,0000. It is recognized that future advances in UF membrane technology may be developed and would be applied in the process and system identified in this disclosure. Although the UF module 110 shown in FIG. 4 includes two permeate outlets, UF modules having a single permeate outlet are also within the scope of this disclosure.

In contrast to the dead-end filtration exemplified in POU system 10 of FIG. 3 where the flow of feed solution being perpendicular to the membrane surface, the UF module 110 of the water polishing system 100 of FIG. 4 may be configured as a cross-flow filtration device, where the majority of the feed flow travels tangentially across the UF membrane, i.e., parallel to the membrane surface, at a positive pressure relative to the permeate side, and therefore the separation process is driven by a pressure gradient across the UF membrane. The cross-flow configuration of the UF module 110 also allows for continuous flow such that solids are continuously flushed from the membrane surface. A proportion of the material that is smaller than the membrane design retention size passes through the membrane as permeate, while the rest is rejected as retentate 128 (otherwise referred to herein as reject water) out a reject outlet 122 of the UF module 110. A reject conduit 124 is fluidly coupled to the reject outlet 122. Non-limiting examples of a UF module that may be used includes the MICROZA™ OLT-6036 ultrafiltration system available from Asahi Kasei Corporation and the VANOX® POU-F System available from Evoqua Water Technologies.

Although the examples discussed herein include an ultrafiltration device as the filtration mechanism in the water polishing system 100, other types of filters are also within the scope of this disclosure. For instance, microfilters, nanofilters, or reverse osmosis devices may also be used in accordance with certain aspects.

The water polishing system 100 also includes a recirculation conduit 120 that is configured to communicate the permeate outlet 116 of the UF module 110 with the inlet 114 and forms a recirculation loop such that permeate is continuously recirculated through the UF module 110. Unlike the system 10 of FIG. 3, flow through the filter (e.g., the UF module 110) is constant and is independent of consumption by the demand source 150. The water polishing system 100 also includes a recirculation pump 115 that is disposed along the recirculation conduit 120 upstream from the inlet 114 of the UF module 110. The recirculation pump 115 is fluidly coupled to the source of UPW 105. The recirculation pump 115 pumps a fluid 170 that includes a blend of both UPW 105 and permeate 126 to the inlet 114 of the UF module 110. The recirculation pump 115 is configured to help provide a driving force for moving fluid through the recirculation conduit 120 by providing additional pressure to the fluid 170. This additional pressure is needed so that permeate 126 can be delivered to the demand source 150 at the minimum pressure required by the demand source 150 after passing through the UF module 110 and other components of the system that may reduce the pressure of the permeate 126. According to some embodiments, the recirculation pump 115 adds pressure energy to the fluid 170, thereby increasing the pressure and flow rate of fluid 170 that passes through the pump. Filters that are mechanically strong and/or have smaller pore sizes can therefore be used in the polishing system 100 because the recirculation pump 115 can overcome the higher head losses associated with these types of membranes. The recirculation pump 115 may also contribute to achieving a constant flow rate of fluid through the UF module 110. For instance, as described below, the recirculation pump 115 may be set to a predetermined speed that remains constant throughout a filtration process. The pressure of the fluid exiting the recirculation pump 115 may be dictated by characteristics of the pump as well as one or more components positioned downstream of the pump, including valves. In some embodiments, the recirculation pump 115 is configured as a centrifugal type of pump as known in the art. For these types of pumps, the discharge pressure increases with the square of the pump speed. The presence of the recirculation pump 115 in system 100 can therefore eliminate or substantially reduce the problems associated with intermittent flow created by the system 10 of FIG. 3, e.g., particle generation.

According to one embodiment, a reject valve 142 positioned on the reject conduit 124 may be used to create a backpressure that provides the driving force for permeate to flow through the UF module 110.

In accordance with certain embodiments, the recirculation pump 115 may be equipped with an adjustable speed drive system which can be controlled by a controller (discussed further below). For example, the speed of the recirculation pump 115 may be adjustable from zero to 8000 rpm. Other ranges of speed are also within the scope of this disclosure, and may be dependent on a particular application and system design. The variable speed motor driving the recirculation pump 115 can be set to a predetermined constant speed by a controller (discussed further below) or by a user based on the flow characteristics required by the UF membrane used in the UF module 110. The controller or user can therefore set the speed of the recirculation pump 110 using the adjustable speed drive of the pump. Increasing the speed of the motor driving the recirculation pump 115 increases the output volume of the recirculation pump 115, whereas decreasing the speed of the motor decreases the output volume.

According to other embodiments, the variable speed motor driving the recirculation pump 115 can be controlled in response to one or more operating parameters, including flow rates, temperatures, and/or pressures of fluids in the water polishing system 100. For instance, a flow rate signal may be used by a controller to control the speed of the recirculation pump 115. According to another example, a pressure signal from the pressure sensor 140 may be used by the controller to control the speed of the recirculation pump 115.

In some embodiments the recirculation pump 115 may be constructed and arranged to minimize particle generation in fluid 170. For instance, the recirculation pump 115 may be configured to minimize or otherwise apply low shear forces to the fluid 170. According to one embodiment, the recirculation pump is a bearingless magnetically levitated centrifugal pump. This type of configuration minimizes the generation of particles that can be abraded from moving components of the drive motor. For instance, magnetic levitation allows for the pump's impeller to be suspended, contact-free, inside a sealed casing where the impeller can be driven by the magnetic field of the motor. The recirculation pump 115 may also be constructed from materials that minimize particle shedding, such as fluorocarbon resins and stainless steel. Suitable examples of recirculation pumps that may be included in the disclosed systems include centrifugal pumps such as the BPS series available from Levitronix, LLC (Waltham, MA).

Referring back to FIG. 4, a supply conduit 145 is fluidly coupled to the recirculation conduit 120 and the demand source 150. The supply conduit 145 is positioned downstream from the permeate outlet 116 of the UF module 110 and supplies permeate 126 to the demand source 150. A flow rate sensor 130 may be disposed downstream from the permeate outlet 116 along the recirculation conduit 120. The flow rate sensor 130 may be configured to generate a flow rate signal indicative of a flow rate of the permeate 126.

The water polishing system 100 also includes a pressure control valve 125 that is disposed along the recirculation conduit 120 downstream from the supply conduit 145. The pressure control valve 125, also referred to herein as a valve arrangement, may be a diaphragm type pressure control valve as known in the art. The pressure control valve 125 is actuable from a closed to an open condition for effecting pressure of permeate 126 to the recirculation pump 115. As explained in further detail below, the pressure control valve 125 is configured to regulate or otherwise control the pressure of the permeate 126 based on measurements from a pressure sensor 140 positioned upstream from the pressure control valve 125. A controller may be used to control operation of the pressure control valve 125 for purposes of maintaining a pressure of the permeate 126 at a predetermined value based on measurements taken from the pressure sensor 140.

A pressure sensor 140 is positioned along the recirculation conduit 120 between the supply conduit 145 and the pressure control valve 125, such that the pressure sensor 140 is located downstream from the supply conduit 145 and upstream from the pressure control valve 125. The pressure sensor 140 is configured to generate a pressure signal indicative of a pressure of the permeate 126 and to send or otherwise transmit the pressure signal to a controller, as explained in further detail below.

Constant flux through the UF module 110 is independent of consumption of permeate 126 of the demand source 150 and is achieved by the recirculation of the permeate 126 through the recirculation conduit 120 and can be maintained by the recirculation pump 115 and the pressure control valve 125. According to one embodiment, flow through the UF module 110 is constant, and is substantially the same as or greater than the maximum flow required by the demand source 150. When the demand source 150 consumption is less than the maximum flow (e.g., the tool is not in use) then flow in excess of the actual consumption of the demand source 150 is constantly recirculated to the suction side of the recirculation pump 115. A constant pressure may be maintained by the pressure control valve 125, which is regulated by a controller based on the value of the pressure measurements taken by the pressure sensor 140. Both constant pressure and constant flow reduce the risk of particle shedding by the UF module 110 and protect the filter material from potential damage.

The water polishing system 100 also includes a UPW make-up conduit 107 that is fluidly coupled to the source of UPW 105 and the recirculation conduit 120. The UPW make-up conduit 107 delivers UPW from the main UPW treatment system to the water polishing system 100 for final polishing before being delivered to the demand source 150. The make-up conduit 107 may also include one or more valves, such as valve 118, for isolating the flow of the UPW to the recirculation conduit 120. For instance, during periods of maintenance, the valve 118 may be used to shut off the source of UPW 105 to isolate the rest of the system. The make-up conduit 107 and recirculation conduit 120 are configured to direct the UPW toward the recirculation pump 115, i.e., the inlet or suction side of the recirculation pump 115, as indicated in FIG. 4.

The water polishing system also includes a blending point 147 where the UPW make-up conduit 107 fluidly connects to the recirculation conduit 120. The blending point 147 allows for permeate 126 from the UF module 110 to blend or otherwise combine with UPW from the source of UPW 105 as fluid 170, which is a blended feed flow to the recirculation pump 115 and inlet 114. The blending point 147 is positioned in the system such that the pressure control valve 125 is located between the blending point 147 and the pressure sensor 140. As discussed in further detail below, a controller is configured to operate the pressure control valve 125 such that the pressure of the permeate 126 is maintained at a predetermined pressure value. The recirculation pump 115 is positioned downstream from the blending point 147 such that fluid 170 that includes UPW 105 and permeate 126 is delivered to the recirculation pump 115.

The water polishing system 100 may also include at least one temperature sensor 135. In some instances the flow rate of the permeate 126 is directly proportional to the water temperature. Thus, if water temperature increases, then the flow rate of the permeate will also increase (assuming a constant reject flow rate). During periods where there is no demand from the demand source 150, the temperature of the permeate will increase by a predetermined amount (e.g., 1.2-2.0° C. or 0.9-1.6° C.) as compared to the temperature of the incoming UPW 105 (assuming a constant reject water flow rate). At higher flow rates, the temperature increase is less. Assuming the transmembrane pressure (TMP) is constant (which, as discussed below, is maintained at a substantially constant value using the pressure sensor 140 and the pressure control valve 126), the temperature increase can result in an increase in the flow rate of the permeate. For example, in some instances the increase in temperature results in a 3-6% increase in the flow rate of the permeate.

In the embodiment shown in FIG. 4 a temperature sensor 135 is coupled to the reject conduit 124 and is configured to generate a temperature signal indicative of a temperature of the retentate 128. Placement of the temperature sensor 135 on the reject conduit 124 reduces the number of fittings and obstructions in the recirculation conduit 120, which avoids particle generation. Furthermore, the temperature of the permeate 126 is the same as the retentate 128. A controller, as described further below, may be configured to control one or more components of the system based on the temperature signal. For instance, the controller may be configured to change a speed of the recirculation pump 115 and/or adjust the pressure control valve 125 based on the temperature signal. In such instances, the temperature sensor 135 sends a temperature signal indicative of the temperature of the retentate 128 to the controller 160. The controller 160 may then change a speed of the recirculation pump 115 and/or adjust the pressure control valve 125 based on the temperature signal. For example, the demand source 150 may require permeate 126 to be within a certain range of predetermined temperature values. The controller 160 may therefore use the temperature readings from the temperature sensor to control the pressure control valve 125 and/or recirculation pump 115 or other components of the system in response to the temperature measurement for purposes of bringing the temperature of the permeate into compliance with the range of predetermined temperature values.

According to one embodiment, the water polishing system 100 further includes a vibration source 165. The vibration source 165 may be coupled to the UF module 110. For instance, the vibration source 165 may be attached to an external wall or another external element of the UF module 110, where the vibrational energy may then be transferred to the UF membrane. The vibration source 165 is configured to deliver a low level vibration to the UF module 110 which results in the removal of small particles from the UPW being filtered. For example, the vibration source 165 may remove particles sized at 30 nm and smaller, 20 nm and smaller, and in some instances 10 nm and smaller from the UPW being filtered. Applying a vibration source to the UF module causes the UF membrane to retain these smaller-sized particles. According to some embodiments, the vibration source may be applied intermittently at predetermined intervals during a filtration process. Application of the vibration source may also be a function of membrane fouling. For instance, the vibration source may be applied at the beginning of a filtration process (i.e., after the membrane has undergone a cleaning process or has just been installed), middle, or end of the process (i.e., after a duration of use, but prior to the membrane being cleaned).

The vibration source 165 may be any device capable of delivering a low level mechanical vibration. The vibration source 165 may be a device configured as a mechanical oscillator that is capable of delivered mechanical energy in the form of vibration to the UF membrane of the UF module 110. The frequency and/or amplitude of the vibration applied by the vibration source 165 may depend on the surface area of the membrane. The vibration applied by the vibration source 165 may also be adjustable. According to some embodiments, a frequency range of the vibrations may be about 20 Hz to about 1000 Hz. In some embodiments, the frequency of the vibration may be at least 60 Hz. According to certain embodiments, an amplitude range of the vibrations may be about 1 m/s$^2$ to about 50 m/s$^2$.

According to various aspects the vibration source 165 may be used with other types of filtration units that may be included in or used in conjunction with the water polishing system 100. For example, a conditioning system may be used for preparing the UF module 110 for use. A vibration source may be attached to one or more components of the conditioning system, such as a filtration unit or platform, and a vibration may be applied during at least a portion of the conditioning process. One example of such a conditioning system is the VANOX® System Hot Water Conditioning (HWC) cart available from Evoqua Water Technologies.

Figure 5:
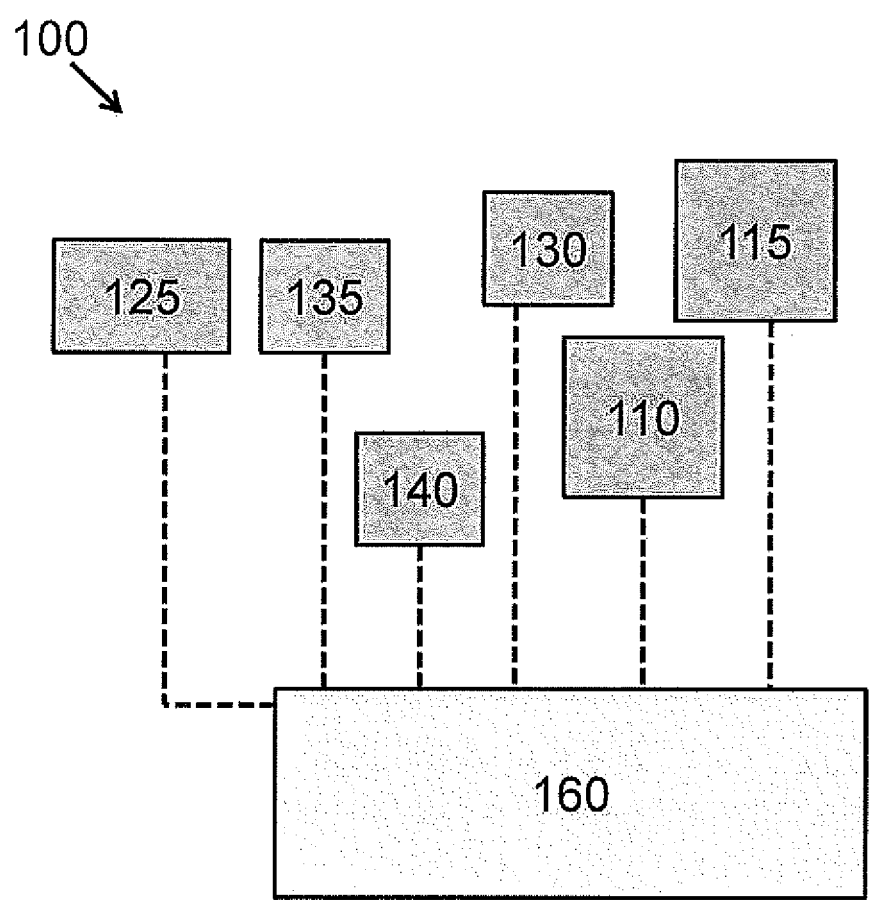
FIG. 5 is a schematic diagram of a water polishing system in accordance with one or more aspects of the invention.

Referring now to FIG. 5, in accordance with one or more embodiments, the water polishing system 100 may include a controller 160, which is operatively coupled to one or more components of the system 100. According to one embodiment, the controller 160 is operatively coupled to the pressure sensor 140 and the pressure control valve 125. In some embodiments, the controller 160 may also be operatively coupled to the flow rate sensor 130 and the temperature sensor 135. As described above, each of the sensors may be configured to measure a property of the system and to transmit or otherwise send these measurements to the controller 160. The controller 160 may also be operatively coupled to other components of the system 100, such as the recirculation pump 115, and in some instances the UF module 110, and may be used to control these components. The controller 160 may control one or more of these components based on at least one measurement taken from one or more of the sensors.

According to one embodiment, the water polishing system 100 is configured to deliver permeate 126 on-demand to the demand source 150. In some instances the water polishing system 100 may be configured to deliver permeate 126 at a predetermined flow rate, for example, at a rate of between zero and 25 gpm to the demand source 150. The water polishing system 100 is configured to recirculate fluid using the recirculation pump 115 through the UF module 110 and the recirculation conduit 120 such that permeate is passed through the UF module 110 multiple times before it is delivered to the demand source 150. The water polishing system 100 is also designed to minimize variations in flow rates and to minimize the generation of particles, i.e., particle shedding. As mentioned above, maintaining a constant pressure and constant flow rate at one or more locations in the system reduces the risk of particle shedding. In one embodiment, maintaining a constant pressure and flow rate can be accomplished via the controller 160 in combination with one or more other components of the system, such as the pressure sensor 140, and the pressure control valve 125. In other embodiments, the flow rate sensor 130 and/or recirculation pump 115 may also be used in maintaining a constant pressure and flow rate.

In one embodiment, the source of UPW is delivered at a first pressure, otherwise referred to herein as the UPW supply pressure. The system 100 is configured to deliver permeate 126 to the demand source 150 at the first pressure within a certain margin of error, e.g., about ±2 psi, and in some application may be less than ±2 psi, and may be referred to herein as a predetermined value for the pressure. In certain instances the predetermined pressure may be the minimum pressure required by the demand source 150, and is therefore dictated by the requirements of the demand source 150.

Delivering permeate 126 to the demand source 150 at the predetermined pressure is accomplished using mechanisms provided by the components of the system. For instance, the recirculation pump 115 may be configured to overcome at least a portion of the pressure losses through the UF module 110 (e.g., TMP), piping (conduits), and valves used in the water polishing system 100 by increasing the pressure of fluid 170 as it passes through the recirculation pump 115. In one embodiment, the recirculation pump 115 is operated at a fixed, i.e., constant speed such that at least a portion of the pressure losses in the system are overcome, and the permeate 126 is delivered to the demand source 150 at the predetermined pressure.

As stated above, the system 100 may be configured to deliver permeate 126 to the demand source 150 at a predetermined flow rate value (or range of values). The predetermined flow rate value may be the minimum flow rate required by the demand source 150. The flow rate of the permeate 126 is proportional to the transmembrane pressure (TMP) of the UF module 110. As discussed further below, the TMP may be controlled for purposes of maintaining a constant flow rate.

In accordance with one embodiment, the speed of the recirculation pump 115 is set to a predetermined value at the beginning of a filtration process and is maintained at the predetermined value. This allows for a substantially constant flow rate of the fluid 170 to the inlet 114 of the UF module 110. The speed of the recirculation pump 115 may be based on one or more factors, including flow characteristics of the UF module 110. For instance, the speed of the recirculation pump 115 may be set to correlate with a maximum flow rate of the UF module 110. The flow rate of the fluid 170 introduced to the inlet 114 of the UF module 110 may in this instance be the maximum flow rate that can be accepted or otherwise processed by the UF module 110. In other instances, the speed of the recirculation pump 115 may be set to correlate with a minimum flow rate of the UF module 110. The flow rate of the fluid 170 introduced to the inlet 114 of the UF module 110 may in this instance be the minimum flow rate that can be accepted or otherwise processed by the UF module 110. The minimum flow rate may correspond to a flow rate that prevents or otherwise minimizes the formation of stagnant water, which could generate additional unwanted particles. According to another example, the speed of the recirculation pump 115 may also be set to a speed that is in between the maximum and minimum flow rate requirements for the UF module. As noted above, operating the recirculation pump 115 at a fixed speed reduces the risk of particle generation in the pump.

The flow rate of the permeate 126 is directly proportional to the transmembrane pressure (TMP) of the UF membrane in the UF module 110. According to some embodiments, maintaining a constant flow rate of permeate 126 may be accomplished by controlling the TMP since flow through the UF module 110 is linearly related to the TMP. The TMP is the pressure difference between the feed pressure (pressure of fluid 170 entering inlet 114) and the permeate pressure (pressure of permeate 126 exiting permeate outlet 116). Since the pressure of fluid 170 entering the UF module 110 is maintained at a constant value by the recirculation pump 115, i.e., by maintaining a constant speed of the pump, in instances where the demand source 150 consumes permeate 126, the permeate pressure drops (which causes the TMP to increase), which in turn creates a higher flow rate through the UF module 110. In one embodiment, the flow rate of permeate 126 may be maintained at a constant value by maintaining the TMP at a predetermined value.

Since the flow rate and pressure of fluid 170 entering the UF module 110 is fixed by the recirculation pump, this can be accomplished by controlling the backpressure of the permeate 126. For instance, according to one embodiment, the pressure control valve 125 is actuated to maintain a substantially constant TMP across the UF membrane of the UF module 110. This can be accomplished by controlling the pressure control valve 125 using measurements taken by the pressure sensor 140. As indicated in FIG. 4, the pressure control valve 125 is positioned on the recirculation conduit 120 downstream of the supply conduit 145 (which supplies permeate to the demand source 150) and upstream of the blending point 147 (where permeate 126 combines with the UPW 105 from the make-up conduit 107). The pressure sensor 140 is positioned just upstream of the pressure control valve 125, but downstream from the supply conduit 145. The pressure sensor 140 measures the pressure of the permeate 126 and sends a signal to the controller 160, which compares the reading to a predetermined value, and responsive to the comparison, actuates or otherwise adjusts the pressure control valve 125. For instance, if the pressure of the permeate 126 falls below the predetermined value, then the controller 160 can actuate the pressure control valve 125 to close a certain amount to increase the pressure of the permeate 126. If the pressure of the permeate 126 is above the predetermined value, then the controller 160 can actuate the pressure control valve 126 to open a certain amount to decrease the pressure of the permeate 126. If the pressure of the permeate 126 is at the predetermined value (or within the margin of error), then no action is taken by the controller 160. As explained above, the predetermined value may be associated with the requirements of the demand source 150, and in some instances may be equal to the pressure of UPW delivered to the system, and in other instances may be equal to the UPW pressure within a certain margin of error, e.g., ±2 psi.

Figure 6:
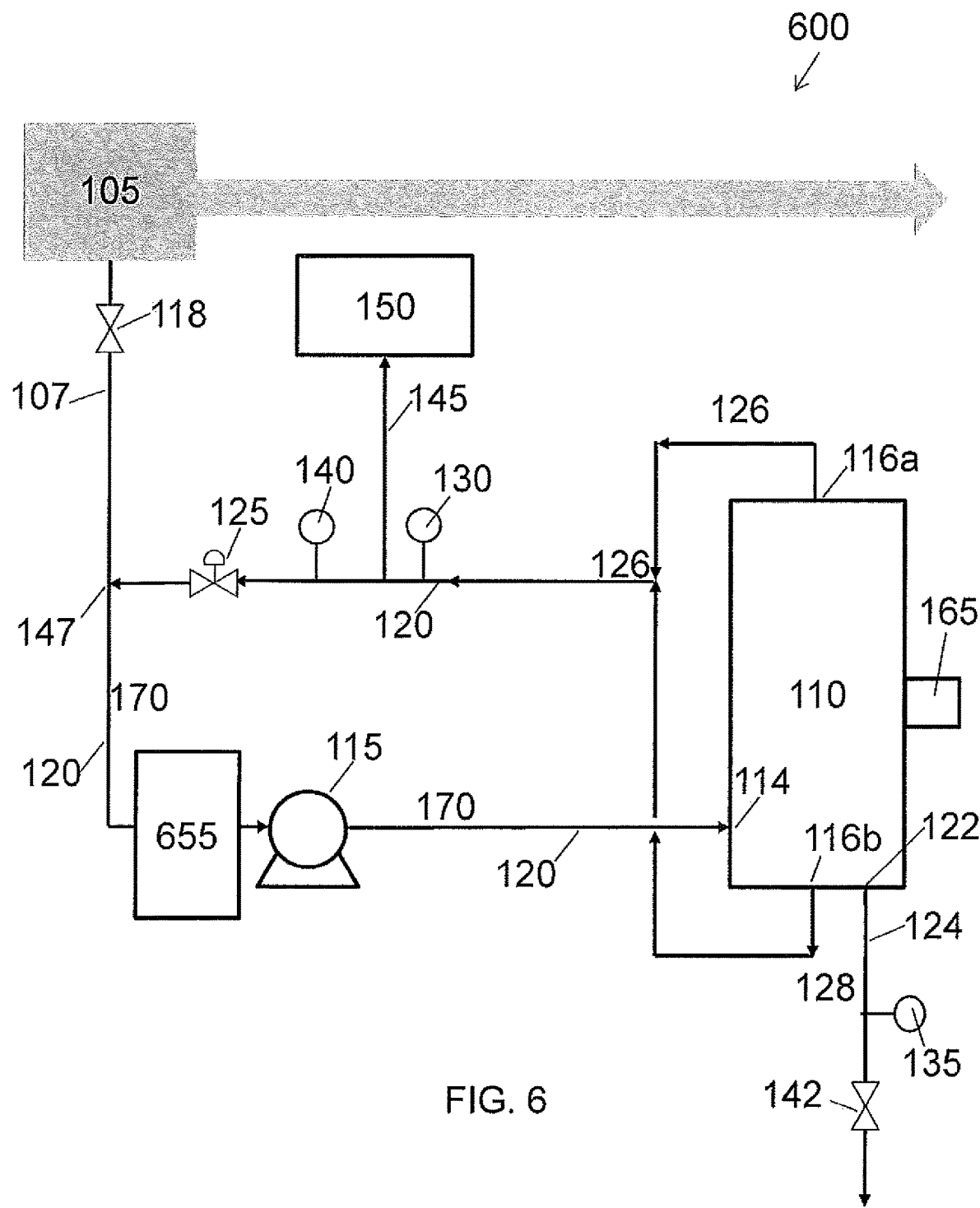
FIG. 6 is a schematic flow diagram of another example of a water polishing system in accordance with one or more aspects of the invention.

In some embodiments, the water polishing system further includes a holding tank. FIG. 6 is a flow diagram of one embodiment of a water polishing system 600 that includes a holding tank 655 that is disposed along the recirculation conduit 120. Water polishing system 600 is similar to water polishing system 100 described above in reference to FIG. 4, but includes the holding tank 655, which according to one embodiment may be positioned at a location along the recirculation conduit 120 that is upstream from the recirculation pump 115, i.e., the suction side of the recirculation pump 115 and downstream from the blending point 147. The purpose of the holding tank 655 may be to allow for fluid in the recirculation conduit to accumulate during periods when there is little or no consumption demand from the demand source 150. Fluid 170 may accumulate in the holding tank 655. Continuous flow through the recirculation conduit 120 is maintained during these periods, and the holding tank 655 allows for excess volume of fluid to accumulate in one location in the recirculation loop.

The holding tank 655 may be a tank or a pipe that is comparable to or greater than a volume or periodic consumption volume of the demand source 150. According to one aspect, when the holding tank 655 becomes full, a majority of the water from the tank continuously passes through the UF module 110 during the entire time period that the demand source 150 remains idle.

According to an alternative embodiment, the holding tank 655 may be positioned at the blending point 147 such that it performs the function of the blending point 147. According to this configuration, the system 600 may further include a level control apparatus that functions to maintain a constant fluid level in the holding tank 655. This permits UPW from the make-up conduit 107 to match the sum of the consumption of the demand source 150 and the retentate 128 exiting via the reject conduit 124.

The holding tank 655 may also function to lower or maintain a lower temperature of the permeate 126. As mentioned above, during periods where the demand source 150 is not using permeate 126, the permeate temperature can increase. In addition, the recirculation pump 115 may increase the temperature of fluid 170. The ability to allow cooler UPW from the source of UPW 105 to be continuously introduced by rejecting retentate 128 at a constant rate helps to maintain a lower temperature, and heat can also be expelled via retentate 128 that exits the system 100.

Although not explicitly shown in the accompanying figures, according to one embodiment the water polishing system may further include a catalyst material. The catalyst material may be any material that functions to protect the membrane in filtration unit, such as the UF membrane used in the UF module 110, by degrading oxidants, such as hydrogen peroxide present in the UPW introduced to the UF module. The oxidants may damage or otherwise harm the UF membrane, and removing these materials from the fluid that comes into contact with the membrane can therefore extend the operating life of the module. The catalyst material may be positioned in between the recirculation pump 115 and the inlet 114 of the UF module 110 so as to treat the UPW prior to contact with the UF membrane. Non-limiting examples of suitable catalysts include platinum, palladium, or enzymes (e.g., catalase).

The water polishing systems disclosed herein may also include other flow control devices, such as valves, reducers, expanders, and the like. In addition, other pressure, temperature, and flow rate sensors may be positioned at one or more locations throughout the system besides the sensors described herein. Other treatment devices may also be included in the water polishing system, such as a heat exchanger. For instance, a heat exchanger may be disposed in the recirculation conduit 120 between the recirculation pump 115 and the inlet 114 of the UF module 110. The heat exchanger may be useful during periods where there is no demand from the demand source 150, and the temperature of the permeate increases.

The water polishing systems described herein may be used in some instances to retrofit or replace a current POU filtration system. An existing facility may be modified to utilize any one or more aspects of the water polishing system, and in some instances, the apparatus and methods may include connecting or configuring an existing facility to comprise a water polishing system as described herein.

In accordance with certain aspects, a method of facilitating polishing of UPW is provided. The method may facilitation one or more parts of a pre-existing or a new treatment system. In certain embodiments, the method may comprise providing an ultrafiltration (UF) module having an inlet and a permeate outlet and providing instructions to: connect the permeate outlet to the inlet, connect the permeate outlet to a pressure control valve, and maintain a pressure of permeate exiting the permeate outlet at a predetermined value with the pressure control valve. In some embodiments, the method of facilitating further includes providing instructions to connect a recirculation pump to the inlet of the UF module, blend the permeate with a source of UPW to form a fluid, and direct the fluid to an inlet of the recirculation pump. In one embodiment, the method of facilitating further includes instructions to connect the permeate outlet to a demand source and measure a pressure of the permeate using a pressure sensor prior to blending with the source of UPW. In another embodiment, the method of facilitating further includes providing a controller that is configured to be operatively coupled to the pressure sensor and the pressure control valve. According to a further embodiment, the method of facilitating further includes providing control instructions to the controller to compare a measured pressure of the permeate to a predetermined value and, responsive to the comparison, actuate the pressure control valve. According to at least one other embodiment, the control instructions instruct the controller to actuate the pressure control valve to maintain a substantially constant transmembrane pressure (TMP) across a UF membrane of the UF module. In yet another embodiment, the method of facilitating further incudes providing at least one of the recirculation pump and the pressure control valve.

EXAMPLES

Aspects of the systems and methods described herein may be further demonstrated by the following examples, which are provided for purposes of illustration only, and do not limit the scope of the invention described herein.

Example 1—Equilibrium Temperature of Permeate Calculations

Figure 7:
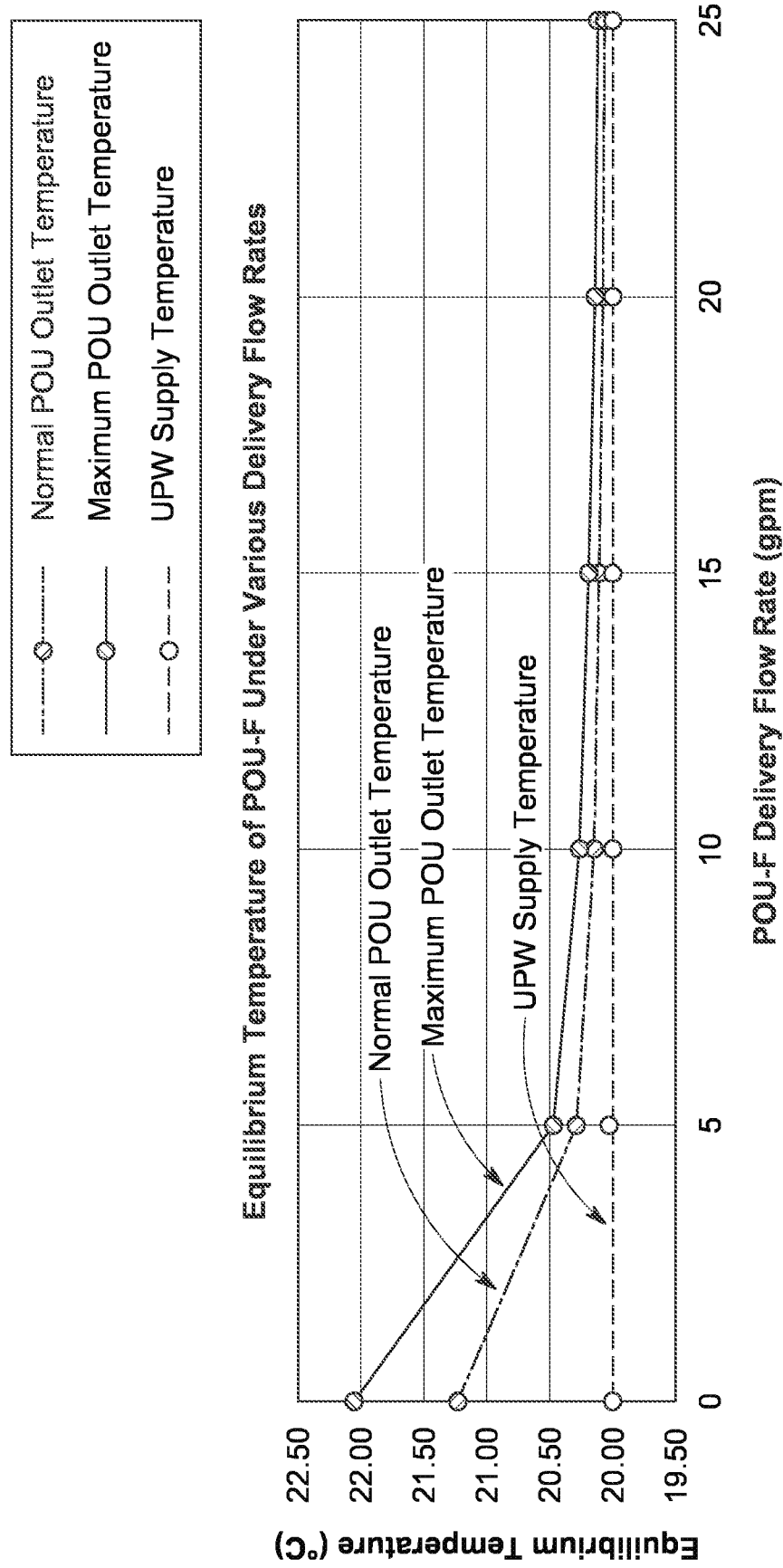
FIG. 7 is a graph showing the temperature of permeate at various flow rates.

Calculations were performed to determine the temperature of permeate under different delivery flow rates. The set-up was assumed to be substantially similar to that shown in system 100 of FIG. 4, with the UF module 110 being a VANOX® POU-F System from Evoqua Water Technologies. The reject flow rate was kept constant at 1.5 gpm while the delivery flow rate, i.e., permeate flow rate exiting the filter (or permeate flow rate flowing to the demand source 150 in the supply conduit 145), was varied between zero and 25 gpm. Two different TMP pressures were used for determining the temperature of the permeate. The first used a TMP pressure of 15 psi (labeled as "normal" in FIG. 7) and the second used a TMP pressure of 20 psi (labeled as "maximum" in FIG. 7). The results are shown in the graph of FIG. 7 and are plotted against the UPW supply temperature, which was 20° C.).

The results indicate that when the permeate delivery flow rate was zero gpm, which is indicative of a situation where the demand source 150 of FIG. 4 is not consuming any permeate, the temperature of the permeate increased by 1.2 to 2.0° C. above the incoming UPW supply temperature. This difference decreased with higher delivery flow rates (i.e., in situations where the demand source 150 consumes permeate). At a flow rate of 5 gpm, the temperature of the permeate increased by less than 0.5° C., and at a flow rate of 10 gpm, the increase in temperature was less than 0.25° C. A higher reject flow rate would also cause a lower temperature increase, i.e., at higher reject flow rates, the temperature rise would be less. For instance, when the reject flow rate was increased to 2 gpm, the temperature increase was 0.9-1.6° C. at the delivery flow rate of zero gpm.

Example 2—Illustration of Control Philosophy

To help better understand some of the control mechanisms described above, three different operational cases are outlined below in reference to the water polishing system 100 shown in FIG. 4. For purposes of illustration, the following assumptions are held:
1. UPW supply 105 pressure to the system is 80 psi
2. TMP is 15 psi
3. For simplicity, the system losses are included in the TMP
4. Reject flow rate of the retentate 128 is 1.5 gpm Condition 1—No Demand from Demand Source 150

The recirculation pump 115 delivers fluid at 95 psi (to overcome the TMP) at a flow rate of 31.5 gpm to the UF module 110. The permeate 126 will have a pressure of 80 psi and a flow rate of 30 gpm. Since there is no consumption by the demand source 150, the entire 30 gpm of permeate 126 may pass through the pressure control valve 125 to be blended with a 1.5 gpm flow rate of UPW from the make-up conduit 107 as fluid 170 at the blending point 147, and is recirculated back to the recirculation pump 115 and UF module 110.

Condition 2—Ramp Up from Zero Gpm Demand to X Gpm Demand from the Demand Source

The recirculation pump 115 continues to deliver fluid at 31.5 gpm at 95 psi, but in this instance, there is demand from the demand source 150, so there is a flow of permeate 126 exiting the recirculation conduit 120 through the supply conduit 145. The pressure of the permeate 126 at the location of the pressure sensor 140 will therefore be less than 80 psi. Based on this measurement, the pressure control valve 125 can be actuated by the controller 160 to close by a certain amount to increase the pressure of the permeate 126 upstream from the blending point 147 back up to 80 psi, so that when the fluid 170 reaches the recirculation pump 115 the pressure is at 80 psi.

Condition 3—Ramp Down from X Gpm Demand to Zero Gpm Demand from the Demand Source The recirculation pump 115 still continues to deliver fluid at 31.5 gpm at a pressure of 95 psi, but in this instance, consumption from the demand source 150 is decreasing. The rate of egress of permeate 126 out of the supply conduit 145 is decreasing, which causes the pressure of the permeate 126 at the location of the pressure sensor 140 to be greater than 80 psi. The pressure control valve 125 can therefore be actuated based on the measured pressure value by the controller to open by a certain amount, which decreases the pressure of the permeate 126 at the location upstream from the blending point 147 back down to 80 psi. Fluid 170 that reaches the recirculation pump 115 will therefore have a pressure of 80 psi.

Example 3—Vibration Experiment

An experiment was performed to test how a low level adjustable vibration source coupled to a filtration unit would influence the retention of small particles, e.g., 20 nm and less in diameter, by the filtration unit.

The filtration unit was a UF POU filtration unit. Particle count measurements of the effluent were performed using a particle analyzer both before and after a vibration source was applied to the external side of the filtration unit. The vibration source was from a vacuum pump placed in proximity to the POU filtration unit.

Figure 8:
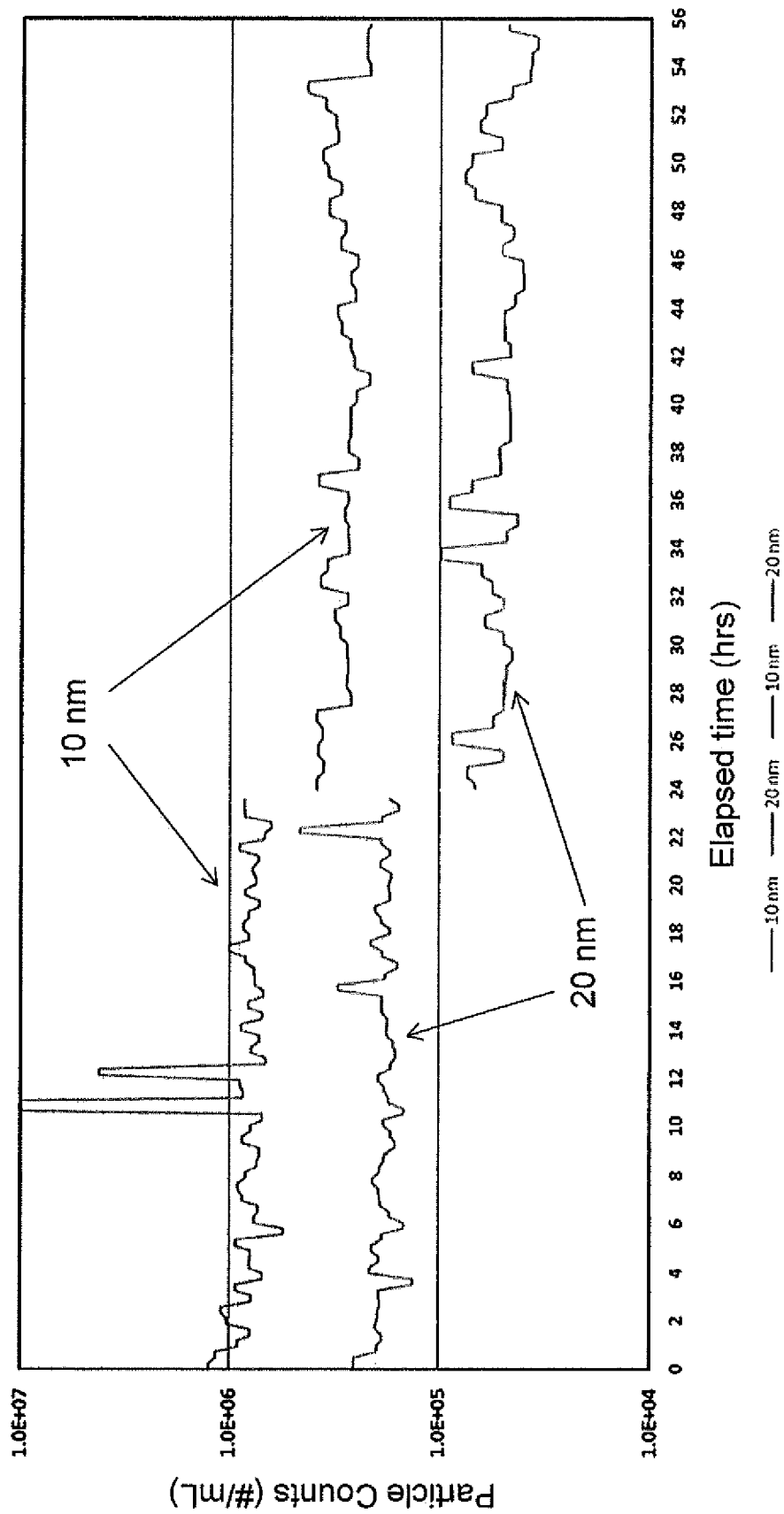
FIG. 8 is a graph showing particle concentration over time.

Control data is shown on the left side of FIG. 8 and shows particle concentration measurements of both 10 nm and 20 nm sized particles taken over an approximate 22 hour time period. This data indicated an approximate 800,000 cts/ml concentration of 20 nm sized particles, and an approximate 1,000,000 cts/ml concentration of 10 nm sized particles.

The right side of FIG. 8 shows particle measurement concentration data taken with a vibration applied to the POU filtration unit. Measurements were taken over an approximate 32 hour time period. The concentration of particles decreased by three to fivefold, with the concentration of 20 nm particles decreasing from about 800,000 cts/ml to about 200,000 and the concentration of 10 nm particles decreasing from about 1,000,000 cts/ml to about 300,000 cts/ml. The results were counterintuitive since vibration usually functions to loosen particles from the components of the filtration system, including the filtration membrane and housing, piping, and other components exposed to the UPW. Although not explicitly shown, the testing also indicated that the vibration did not significantly improve the retention of particles sized greater than 50 nm. Applying a source of vibration to the filtration unit may therefore be helpful in applications where there is a need to enhance the removal of particles sized at 20 nm and smaller.

Figure 9:
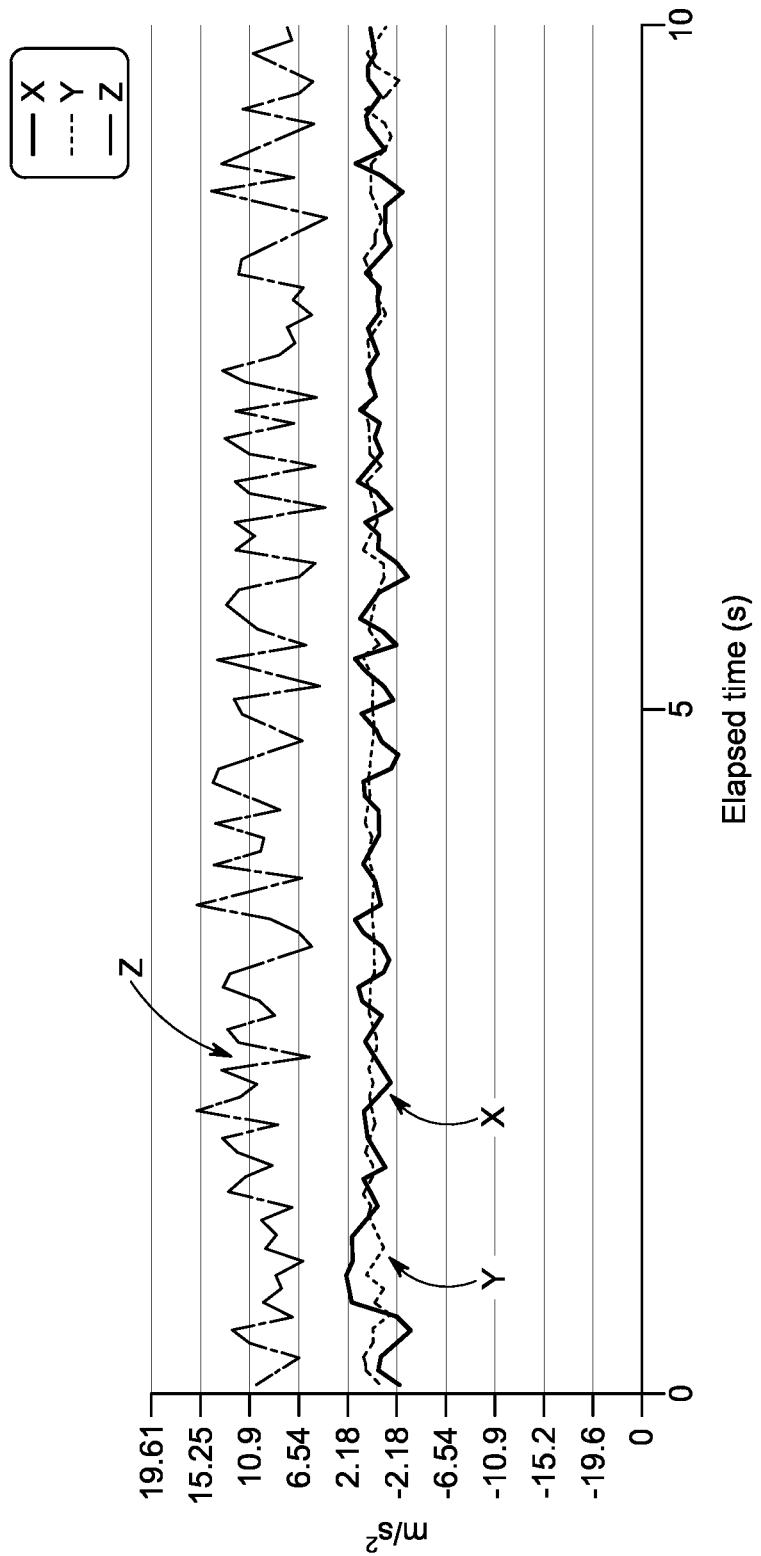
FIG. 9 is a first graph showing accelerometer data over time.
Figure 10:
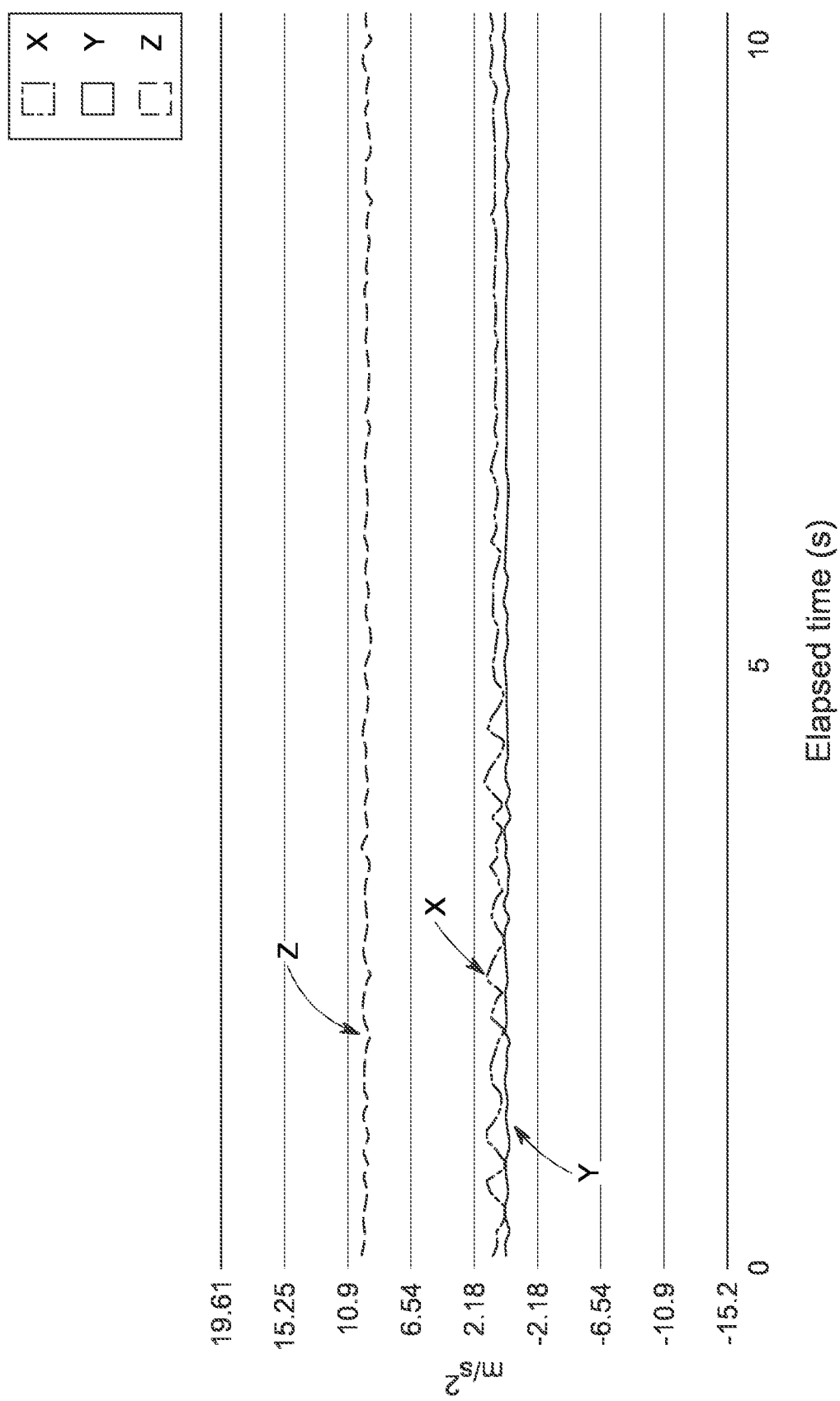
FIG. 10 is a second graph showing accelerometer data over time.

FIG. 9 is a graph showing vibration data over time obtained from an accelerometer positioned on the filtration unit while vibration was applied. The vibration data includes x, y, and z directional data from the accelerometer. FIG. 10 is a graph showing vibration data from a different type of filtration unit, with the same vibration source applied in a similar manner as described above. The filtration unit used in obtaining this data was from a VANOX® System Hot Water Conditioning (HWC) Cart available from Evoqua Water Technologies and included a UF membrane. The left side of the graph shown in FIG. 10 is vibration data during a period of time where vibration was applied, and the right side of the graph indicates a period where no vibration was applied.

Example 4—Constant Flux Retention Efficiency

Figure 11:
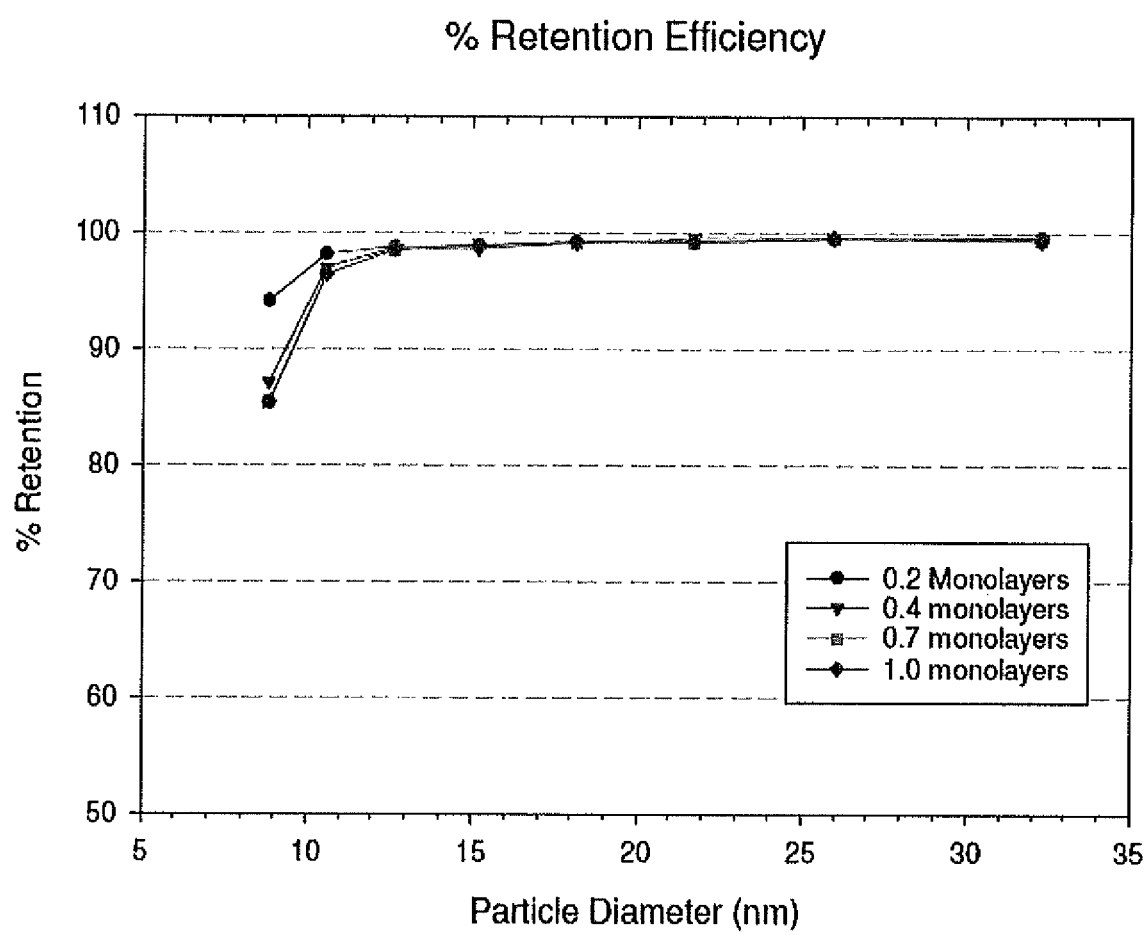
FIG. 11 is a graph showing the percent retention efficiency for an ultrafiltration system in removing particles of various sizes from UPW in accordance with certain aspects of the invention.

As a comparison to the dead-end cartridge filter retention data presented in FIG. 1, a UF module that included a 6000 MWCO membrane was tested for particle retention. The UF device was operated under a constant flux, and the results are presented in FIG. 11. The data presented in the graph of FIG. 11 shows that under constant flux, the UF membrane was effective at removing particles having a diameter of larger than 15 nm, and was capable of removing between about 85-95% of particles sized at 10 nm.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A water polishing system comprising:
 a source of ultrapure water (UPW);
 an ultrafiltration (UF) module having an inlet and a permeate outlet;
 a recirculation conduit communicating the permeate outlet with the inlet and forming a recirculation loop;
 a recirculation pump disposed along the recirculation conduit upstream from the inlet of the UF module and fluidly coupled to the source of UPW;
 a supply conduit fluidly coupled to the recirculating conduit and a demand source, the supply conduit positioned downstream from the permeate outlet;
 a pressure control valve disposed along the recirculation conduit downstream from the supply conduit and configured to maintain a pressure of the permeate at a predetermined value; and
 a pressure sensor positioned along the recirculation conduit between the supply conduit and the pressure control valve, configured to generate a pressure signal indicative of a pressure of the permeate.

2. The water polishing system of claim 1, further comprising a controller operatively coupled to the pressure sensor and configured to control operation of the pressure control valve based on the pressure signal.

3. The water polishing system of claim 2, further comprising:
   a UPW make-up conduit fluidly coupled to the source of UPW and the recirculation conduit; and
   a blending point where the UPW make-up conduit fluidly connects to the recirculation conduit such that the pressure control valve is positioned between the blending point and the pressure sensor, and the controller is configured to operate the pressure control valve such that the pressure of the permeate is maintained at a predetermined pressure value.

4. The water polishing system of claim 3, wherein the recirculation pump is positioned downstream from the blending point such that a fluid including UPW and permeate is delivered to the recirculation pump at the predetermined pressure value.

5. The water polishing system of claim 4, wherein the recirculation pump is configured to operate at a predetermined constant speed.

6. The water polishing system of claim 4, wherein the UF module further includes a reject outlet for retentate from the UF module and a reject conduit fluidly coupled to the reject outlet.

7. The water polishing system of claim 1, further comprising a holding tank disposed along the recirculation conduit.

8. The water polishing system of claim 1, further comprising a vibration source coupled to the UF module.

9. A method of facilitating polishing of ultrapure water (UPW), comprising:
   providing an ultrafiltration (UF) module having an inlet and a permeate outlet; and
   connecting the permeate outlet to the inlet; connecting the permeate outlet to a pressure control valve;
   maintaining a pressure of permeate exiting the permeate outlet at a predetermined value with the pressure control valve;
   connecting a recirculation pump to the inlet of the UF module;
   blending the permeate with a source of UPW to form a fluid; directing the fluid to an inlet of the recirculation pump;
   connecting the permeate outlet to a demand source; and
   measuring a pressure of the permeate downstream of the pressure control valve using a pressure sensor prior to blending the permeate with the source of UPW.

10. The method of claim 9, further comprising providing a controller that is configured to be operatively coupled to the pressure sensor and the pressure control valve.

11. The method of claim 10, wherein the controller is configured to compare a measured pressure of the permeate to a predetermined value and, responsive to the comparison, actuate the pressure control valve.

12. The method of claim 11, wherein the controller is configured to actuate the pressure control valve to maintain a substantially constant transmembrane pressure (TMP) across a UF membrane of the UF module.

* * * * *